United States Patent Office 3,481,403
Patented Dec. 2, 1969

3,481,403
METHOD FOR CONSOLIDATING FORMATIONS SURROUNDING BOREHOLES WITH RESIN
John L. Gidley, William M. Terry, and Fred A. Brooks, Jr., Houston, Tex., assignors to Esso Production Research Company, a corporation of Delaware
No Drawing. Filed July 26, 1968, Ser. No. 747,812
Int. Cl. E21b *33/138*
U.S. Cl. 166—295                         20 Claims

ABSTRACT OF THE DISCLOSURE

A method for consolidating an incompetent formation surrounding a borehole wherein a low molecular weight glycol ether is injected into the formation and a resin is thereafter employed to bond the formation solids in place.

BACKGROUND OF THE INVENTION

Field of the invention

This invention relates to the use of resins for the consolidation of incompetent formations surrounding oil wells, gas wells, water injection wells, and similar boreholes.

Description of the prior art

Difficulties due to solids in the produced fluids have led to the use of variety of different resins for the consolidation of incompetent formations surrounding oil wells, gas wells and similar boreholes. The methods employed are of two general types: (1) those in which a resin solution or mixture of resin-forming materials containing a catalyst or hardening agent is injected into the formation to bond the formation solids in place; and (2) the in-situ methods in which a solution containing one or more materials used in forming the resin is first injected to coat the solid particles and a second solution containing a catalyst or other necessary resin component is subsequently injected to form the bond. Experience has shown that such methods are generally satisfactory but that problems due to high injection pressure requirements, poor bonding strength, and severe permeability damage are often encountered, particularly in "dirty" sands. It has been found that these difficulties can be alleviated by pretreating the formation with a surfactant solution or with certain low molecular weight alcohols, aldehydes, ketones, amines or simple ethers that will remove connate water from the sand and render it preferentially wettable by the resin solution or solution of resin-forming materials. These agents generally require a prolonged waiting period before the resin solution or solution of resin-forming materials is injected. This increases the cost of the consolidation treatment and may give rise to other problems.

SUMMARY OF THE INVENTION

In accordance with this invention, it has now been found that the difficulties outlined above can generally be alleviated by pretreating the unconsolidated formation with an alkyl ether of a $C_2$ to $C_6$ glycol containing at least one $C_1$ to $C_6$ alkyl substituent attached to the molecule through an ether linkage and thereafter injecting the resin solution or mixture of resinous materials to be used for consolidation purposes. Tests have shown that pretreatment of the formation with the glycol ether facilitates injection of the resinous material, improves the strength obtained on setting of the resin, reduces permeability losses during the consolidation process, and eliminates the necessity for a waiting period between the pretreatment and injection of the resin-forming material. It has also been found that the glycol ethers are effective in the absence of coupling agents and that contamination problems frequently encountered with other treating agents are avoided. These and other advantages make the process of this invention useful in formations that are difficult to consolidate by conventional methods.

The glycol ethers utilized for purposes of this invention are surprisingly more effective than pretreating agents employed in the past. The reasons for this superiority are not fully understood. Although the glycol ethers apparently extract water from montmorillonite and mixed layer clays that have swelled and become dispersed in aqueous fluids native to the formation or introduced during drilling, completion of workover operations they evidently perform other functions not fulfilled by the materials utilized heretofore. The substantially higher degree of permeability retention obtained, the significantly greater strength secured without silanes or similar coupling agents, and the effectiveness of the glycol ethers without a waiting period all suggest that mechanisms in addition to those obtained with the conventional treating agents take place. These improve performance of the resins and make plastic sand consolidation a more versatile process.

DESCRIPTION OF THE PREFERRED EMBODIMENTS

The glycol ethers useful for purposes of the invention are alkyl ethers of $C_2$ to $C_6$ glycols containing at least one $C_1$ to $C_6$ alkyl group attached through an ether linkage. Suitable compounds include ethylene glycol monomethyl ether, ethylene glycol dimethyl ether, ethylene glycol monoethyl ether, ethylene glycol diethyl ether, ethylene glycol monopropyl ether, ethylene glycol monobutyl ether, propylene glycol monomethyl ether, propylene glycol diethyl ether, propylene glycol monohexyl ether, butylene glycol monoethyl ether, butylene glycol dimethyl ether, butylene glycol monopropyl ether, amylene glycol dimethyl ether, hexylene glycol monomethyl ether and the like. Mixtures of the glycol ethers can also be used. The ethylene glycol ethers are readily available at moderate cost and are therefore preferred for purposes of the invention. Ethylene glycol monobutyl ether has been found to be particularly effective as a pretreating agent.

The preflush utilized in accordance with the invention may consist of a glycol ether alone or may instead be a solution of the glycol ether in a hydrocarbon oil. Suitable oils include heavy naphthas, kerosenes, diesel fuels, heating oils, light gas oils, heavy cracked residua, or similar petroleum fractions. Low viscosity crude oils may also be used. If an oil solution is employed, it is generally preferred to use a solution containing the ether in a concentration between about 5% and about 20% by volume but more concentrated solutions also give good results. The use of the ethers in the absence of oil is particularly effective but is generally somewhat more expensive than the use of oil solutions containing the glycol ethers. The latter procedure may therefore be preferable.

The treating agents of the invention may be utilized in conjunction with a variety of different resinous materials. The phenol-formaldehyde type resins prepared by the reaction of formaldehyde, acetaldehyde, propionaldehyde or a mixture of water-soluble aldehydes with a low molecular weight hydroxy aryl compound such as phenol, cresol, β-naphthol, resorcinol, xylenol, cresylic acid or a mixture of such compounds is a weight ratio between 1:1 and about 9:1 are preferred. The reaction of these materials to form the resins can be catalyzed by the addition from about 2% to about 10% by weight, based on the aldehyde-hydroxy aryl compound mixture, of an alkaline catalyst soch as guanidine carbonate, aminoguanidine bicarbonate, sodium hydroxide, sodium carbonate, ethyl amine, triethyl amine, aniline, ethylene diamine or the like. From about 0.25% to about 10% by weight, based on the aldehyde-hydroxy aryl compound mixture, of an acid cataylst such as stannous chloride, magnesium chloride, hydrochloric acid, sulfuric acid, maleic anhydride, picric acid, benezene sulfonic acid, sulfanilic acid, α-naphthylamine sulfonic acid, sodium-1 naphthylamine-3, 6, 8-trisulfonate, or the like can be used.

The water-soluble aldehyde, low molecular weight hydroxy aryl compound and catalyst employed for production of the phenol-formaldehyde type resins are preferably mixed before they are injected into the formation but may be utilized in a two-stage procedure if desired. The solution injected in the first stage of such a two-stage procedure will normally include all of the reactants except the low molecular weight hydroxy aryl compound. The solution injected in the second stage will generally be an oil solution which contains the hydroxy aryl compound and is substantially immiscible with the first solution. The second solution displaces excess quantities of the first solution from the pore spaces in the formation and at the same time contributes low molecular weight hydroxy aryl compound to the remaining portion of the first solution to permit reaction of the materials and formation of the resin. The use of phenol-formaldehyde resins and reactive mixtures which produce such resins has been described at length in the patent literature and will be familiar to those skilled in the art.

Epoxy resins can be used for purposes of the invention in lieu of the aldehyde type resins described above. Useful epoxies include the diglycidyl ethers of bisphenol A [bis (4-hydroxy phenol) dimethyl methane] obtained by the reaction between epichlorohydrin (1-chloro-2, 3 epoxy propane) and bisphenol A in the presence of an alkali such as sodium hydroxide or potassium hydroxide. Similar resins can be prepared by reacting a mononuclear di- or trihydroxy phenol such as resorcinol, hydroquinone, pyrocatechol or phloroglucinol or a polynuclear polyhydroxy phenol such as 4,4-dihydroxy biphenyl with a halohydrin such as 1,2-dichloro-3-hydroxy propane or dichlorohydrin. Still other satisfactory materials include the commercial epoxy resins prepared by the condensation of novolac resins with epichlorohydrin.

The epoxy resins are employed in conjunction with curing agents or catalysts such as diethylene triamine, ethylene diamine, triethylene tetramine, dimethylamino propyl amine, diethylamino propyl amine, piperidine, menthane diamine, triethylamine, benzyl diethylene diethylamino phenol, ditrimethylaminomethylphenol, α methylbenzyl dimethylamine, meta xylene diamine, 4,4-methylene dianiline and mixtures of such amines. Acidic catalysts such as oxalic acid, phthalic acid, pyromellitic acid, pyromellitic dianhydride and dodecenyl succinic anhydride can also be employed.

The epoxy resins may be used in single stage operations wherein a mixture of the resin and an inert diluent is injected into the formation or in two-stage operations in which the resin is first dissolved in a solvent such as a mixture of ethyl alcohol, acetone or ethyl ketone with kerosene, diesel oil, or white oil containing added aromatics and is injected into the formation and a kerosene or similar oil that is substantially free of aromatics and contains a catalyst or curing agent is therefter injected. The later injected solution displaces excess resin solution from the pore spaces. The catalyst or curing agent contained in the second solution is extracted by the resin solution that remains in contact with the sand grains. In the presence of the extracted catalyst or curing agent the resin hardens and bonds the individual sand grains in place. The use of epoxy resins in both single stage and two-stage sand consolidation processes has also been described in the prior art.

Still other resins that may be employed in carrying out the invention include the furfuryl alcohol resins and the urea formaldehyde resins. The furfuryl alcohol formulations are generally utilized by injecting furfuryl alcohol, furfuryl alcohol resin, or a mixture of the alcohol and resin into the formation and thereafter pumping in an oil overflush solution containing a low molecular weight organic acid such as trichloroacetic acid or a delayed acid-producing chemical as a catalyst or curing agent. An oil preflush containing a surface active agent is generally used to remove water blocks and render the sand preferentially water wet. The resin solution usually contains a surfactant and a silane compound designed to improve bonding to the sand grains. A diesel oil "spacer" is normally injected between the resin solution and the catalyst or curing agent solution. The urea-formaldehyde resins are employed by injecting an aqueous solution containing urea, formaldehyde, an accelerator such as ammonium sulfate or ammonium chloride, and a retarder such as ammonium hydroxide hexamethylenetetramine into the formation and allowing the material to set. Magnesium chloride or a similar chloride salt can be added to facilitate polymerization in carbonate formations. Further details concerning these furfuryl alcohol and urea formaldehyde resins can be found in the literature.

The glycol ethers utilized in carrying out the invention will generally be employed in quantities between about 5 and about 100 U.S. gallons per foot of formation thickness. The quantity required for optimum results will normally depend in part on the permeability, porosity and clay content of the formation, upon the composition of the fluids in the formation, upon the particular glycol ether or ether solution selected, upon the particular resin or mixture of resin-forming constituents to be used, and, if an ether solution is employed, upon the concentration of the solution. The use of from about 10 to about 50 gallons of glycol ether or from about 50 to about 350 gallons of glycol ether solution per foot of formation thickness is generally preferred.

Although the glycol ethers generally give satisfactory results in the absence of coupling agents, silane compounds or similar agents may be employed in conjunction with the ethers if desired. The amino-functional organo silanes are generally preferred. Typical silanes that may be employed include 2-aminoethyl-aminopropyl-trimethoxy silane,
2-aminoethyl-aminopropyl-triethyleneoxide silane,
2-aminomethyl-aminopropyl-trimethoxy silane,
2-aminopropyl-aminopropyl-trimethoxy silane,
1-trimethoxy-2-aminoethyl-2-aminopropyl disilane,
1-triethyloxide-2-aminoethyl-2-aminopropyl disilane,
1-trimethoxy-2-aminopropyl-2-aminopropyl disilane, and
1-trimethoxy-2-aminoethyl-2-aminoethyl disilane.

These and similar compounds may be incorporated in the glycol ethers in concentrations in the range between about 0.1% and about 10% by weight but will preferably be employed between about 1% and about 5% by weight. Silanes can also be added to the resins is desired.

If the formation to be consolidated has produced significant quantities of sand, it will generally be advisable to inject sand or gravel through the perforations and thus fill in any cavities that exist behind the casing before commencing the sand consolidation treatment. This can be done by suspending the sand or gravel in salt water, diesel oil or a similar fluid and then injecting this fluid through the perforations. Any sand remaining in the wellbore at the conclusion of this operation is then washed out. Once this has been done, the tubing and casing in the well can be filled with diesel oil and the injectivity of the formation can be checked. The glycol ether or ether solution, alone or in combination with a coupling agent or other additives, is then pumped into the formation. As pointed out above, the glycol ethers give satisfactory results without the waiting period normally necessary when other pretreating agents are used and hence the consolidation process can be continued without interruption following the pretreatment.

The resin solution or mixture of resin-forming materials to be employed for consolidation purposes is pumped into the well and injected in the surrounding formation following the pretreatment. The procedure employed will depend upon the particular resin selected and the temperature of the formation to be treated. It is generally preferred, in formations below about 140° F., to utilize a phenol-formaldehyde type resin solution containing about 5 parts of Formalin by weight, about 1 part of meta-para cresol, about 2%, 1, 3, 5 xylenol, based on the weight of Formalin and meta-para cresol, about 13% guanidine carbonate, based on the weight of Formalin and meta-para cresol, and about 2% sodium hydroxide, based on the weight of Formalin and meta-para cresol, and to then follow this with an afterflush of diesel oil containing about 2% meta-para cresol to prevent the extraction of cresol from the unset resin. In formations between about 140° and about 175° F., the xylenol can be omitted and the amounts of guanidine carbonate and sodium hydroxide can be reduced. In formations above 175° F., phenol is generally substituted for the cresol and xylenol, less guanidine carbonate is used, and more sodium hydroxide is employed. If an epoxy resin is used, it is normally preferred to inject an alcohol-kerosene solution containing about 50% or more of the resin and then follow this with from about 2 to about 10 volumes of a kerosene solution containing from about 0.5% to about 10% by weight of the catalyst or curing agent. After the resin solution or mixture of resin-forming materials has been injected, either in a single stage or in two or more stages, the well will normally be shut in to permit hardening of the resin. The hardening period required will depend in part on the reservoir temperature and the effectiveness of the particular catalyst or curing agent employed. In general hardening periods from about 8 hours to about 72 hours are used. Following hardening of the resin, the well can be returned to production.

The process of the invention can also be carried out with "shoot-and-inject" tools used for the completion of wells in unconsolidated formations. Such tools normally include a shaped charge for perforating the casing and means for the sequential injection of two or more fluids through the perforation into the surrounding formation. In a typical operation carried out with conventional tools, one-half gallon or more of ethylene glycol monobutyl ether or a similar glycol ether is forced into the formation after the casing has been perforated and this is then followed by the sand consolidation chemicals. The use of a glycol ether in this manner has particular advantages because no waiting time is required. The resin solution or solution of resin-forming materials can be injected into the formation immediately following injection of the glycol ether and hence the shoot-and-inject tool does not have to be left in place during a prolonged waiting period. This expedites the shoot-and-inject operation and facilitates the carrying out of such operations in wells requiring multiple perforations.

Following the injection of the sand consolidation chemicals, it is often advantageous to employ a glycol ether or an oil solution containing from about 1% to about 20% of such an ether to improve permeability and clean up the formation when the well is placed on production. The oil used for this purpose may be a heavy naphtha, kerosene, diesel fuel, heating oil, light gas oil, heavy cracked residuum, or a similar petroleum fraction. A low viscosity crude oil may also be used. Any of the glycol ethers referred to earlier may be employed. The afterflush will preferably be an oil solution containing ethylene glycol monobutyl ether in a concentration of from about 5% to about 15% by volume and will preferably be injected in a quantity of from about 50 to about 350 gallons per foot of formation thickness. In small volume shoot-and-inject operations in which such an afterflush is used, however, about three to four gallons or more of the glycol ether or ether solution will ordinarily be used. In lieu of injecting the afterflush immediately after the sand consolidation chemicals, the resin can be allowed to cure completely and the glycol ether or ether solution can then be injected into the formation to clean up the sand and stimulate production. In either case the use of such an afterflush will frequently result in greater production than might otherwise be obtained.

The advantages of the process of the invention are illustrated by the results of experimental tests carried out with a base-catalyzed phenol-formaldehyde resin on samples of an unconsolidated oil producing formation found at a depth of from 4855 to 4857.5 feet in an offshore Louisiana oilfield. The clay mineral content of this formation included 0.3% kaolinite, 1.0% illite and 2.7% montmorillonite, all expressed on a weight basis. Sand tubes 3⅞ inches long and 1 inch in diameter containing this material were prepared. In each case the sand was saturated to simulate an oil bearing formation containing connate water. The tests were carried out in a water bath at a temperature of 132° F. to simulate formation temperature conditions. In the first test, a solution of 6% salt water containing 1% by weight of 2-aminoethyl-aminopropyl-trimethoxy silane was injected into the sand tube as a preflush. A premixed phenol-formaldehyde resin solution was then injected to consolidate the sand grains. The resin solution contained 70.4 weight percent Formalin, 13.5 weight percent meta-para cresol, 2.8 weight percent 1, 3, 5 xylenol, 11.8 weight percent of guanidine carbonate, and 1.5 weight percent sodium hydroxide. This was followed by an afterflush solution consisting of diesel oil containing 1.8% meta-para cresol. Forty cubic centimeters of resin solution and 35 cubic centimeters of afterflush were used. The solutions were injected under a differential pressure of 50 pounds per square inch. The injection rate in cubic centimeters per second was measured during this test and, following injection of the resin, the core was allowed to cure at 132° F. for 24 hours.

A second test identical to the first test but utilizing ethylene glycol monobutyl ether as a preflush in place of the salt water-silane solution employed earlier was also carried out. After both cores had cured for the 24 hour period, the permeabilities were measured and the compressive strength of the consolidated materials were determined. The results of these tests are set forth in the following table.

| Preflush | Injectivity Q (cc./sec.)/ p (atm.) | Permeability Retention, Percent | Comp. Str., p.s.i. |
|---|---|---|---|
| Test No.: | | | |
| 1 — 1% Silane [1] in 6% salt water | 0.14 | 20.8 | 731 |
| 2 — Ethylene glycol monobutyl ether | 0.47 | 68.7 | 857 |

[1] 2-aminoethyl-amino-propyl-trimethoxy silane.

It can be seen from the data in the table that the use of the glycol ether in place of the usual brine preflush employed in Test No. 1 resulted in a more than three fold improvement in injectivity of the resin solution. The permeability retention with the glycol ether was also more than three times that obtained with the salt water-silane preflush. The tests of compressive strength showed that the material in which the glycol ether was used was nearly 20% stronger than that in which the silane-water preflush was employed. These data thus show that the glycol ethers improve injectivity, give greater permeability retention, result in higher compressive strength, permit consolidation without a coupling agent and give satisfactory results without a waiting period between injection of a preflush and introduction of the resin-forming material into the formation. These advantages make the consolidation process of the invention less expensive than processes utilized heretofore, often permit the consolidation of formations that are not susceptible to consolidation by conventional techniques, and may permit greater injection or production rates following consolidation than would otherwise be possible.

We claim:
1. In a method for the consolidation of an incompetent subterranean formation surrounding a well wherein a resinous material is injected into the formation and allowed to harden, the improvement which comprises introducing an alkyl ether of a $C_2$ to a $C_6$ glycol having at least one $C_1$ to $C_6$ alkyl substituent attached to the molecule through an ether linkage into said formation and thereafter injecting said resinous materal into said formation.
2. A method as defined by claim 1 wherein said ether is an ethylene glycol ether.
3. A method as defined by claim 2 wherein said ether is ethylene glycol monobutyl ether.
4. A method as defined by claim 1 wherein said resinous material is a hydroxy aryl-aldehyde resin.
5. A method as defined by claim 1 wherein said ether is introduced into said formation as a hydrocarbon oil solution of the ether.
6. A method as defined by claim 5 wherein said ether is present in said solution in a concentration between about 5% and about 20% by volume.
7. A method as defined by claim 1 wherein from about 10 to 100 gallons of said ether is introduced into said formation per foot of formation thickness.
8. A method as defined by claim 1 wherein said resinous material is injected into said formation in two parts.
9. A method as defined by claim 1 wherein said resinous material is an epoxy resin.
10. A method as defined by claim 1 wherein said resinous material is injected into said formation immediately following the introduction of said ether.
11. A method as defined by claim 1 wherein said resinous material is a furfuryl alcohol resin.
12. A method as defined by claim 1 wherein said resinous material is a urea-formaldehyde resin.
13. A method as defined by claim 1 wherein said ether and said resinous material are injected into said formation from a shoot-and-inject tool.
14. A method as defined by claim 1 wherein said resinous material is a base-catalyzed phenol formaldehyde.
15. A method as defined by claim 1 wherein a glycol ether is introduced into said formation following the injection of said resinous material.
16. A method as defined by claim 15 wherein said ether is ethylene glycol monobutyl ether.
17. A method as defined by claim 15 wherein said resinous material and said glycol ether are injected into said formation from a shoot-and-inject tool.
18. In a method for the consolidation of an incompetent subterranean formation surrounding a well wherein a resinous material is injected into the formation and allowed to harden, the improvement which comprises introducing an alkyl ether of a $C_2$ to $C_6$ glycol having at least one $C_1$ to $C_6$ alkyl substituent attached to the molecule through an ether linkage into said formation following the injection of said resinous material.
19. A method as defined by claim 18 wherein said ether is ethylene glycol monobutyl ether.
20. A method as defined by claim 18 wherein said ether is introduced into said formation as a hydrocarbon oil solution of the ether.

References Cited

UNITED STATES PATENTS

| | | | |
|---|---|---|---|
| 3,339,633 | 9/1967 | Richardson | 166—295 |
| 3,419,073 | 12/1968 | Brooks | 166—295 |

CHARLES E. O'CONNELL, Primary Examiner

IAN A. CALVERT, Assistant Examiner

U.S. Cl. X.R.

166—312